United States Patent [19]

Leischner

[11] Patent Number: 5,096,255
[45] Date of Patent: Mar. 17, 1992

[54] FIXED WINDOW MOUNTING ASSEMBLY

[75] Inventor: Richard D. Leischner, Belleville, Mich.

[73] Assignee: Ford Motor Company, Dearborn, Mich.

[21] Appl. No.: 597,467

[22] Filed: Oct. 15, 1990

[51] Int. Cl.$^5$ .............................................. B60J 1/10
[52] U.S. Cl. ....................................... 296/201; 52/208
[58] Field of Search ............... 296/201, 93, 84.1, 146; 52/208

[56] References Cited

U.S. PATENT DOCUMENTS

| | | | |
|---|---|---|---|
| 2,132,688 | 10/1938 | Helwig | 52/208 |
| 2,834,998 | 5/1958 | Wilder | 52/208 |
| 4,364,595 | 12/1982 | Morgan et al. | 296/84.1 |
| 4,650,240 | 3/1987 | Rinella | 296/93 |
| 4,723,809 | 2/1988 | Kida et al. | 296/84.1 |
| 4,768,319 | 9/1988 | Derner | 52/208 |
| 4,841,698 | 6/1989 | Gold | 52/208 |

FOREIGN PATENT DOCUMENTS 3627536 2/1988 Fed. Rep. of Germany .

*Primary Examiner*—Robert R. Song
*Attorney, Agent, or Firm*—Daniel M. Stock; Roger L. May

[57] ABSTRACT

A mounting assembly is provided for effecting the flush mounting of a non-movable window with respect to adjacent body panels of an automobile. The assembly provides a molded plastic annular frame member positioned between the window and a depressed flange of the vehicle body. The frame receives a plurality of fasteners in rotatively fast relationship for assembly on the body flange.

12 Claims, 2 Drawing Sheets

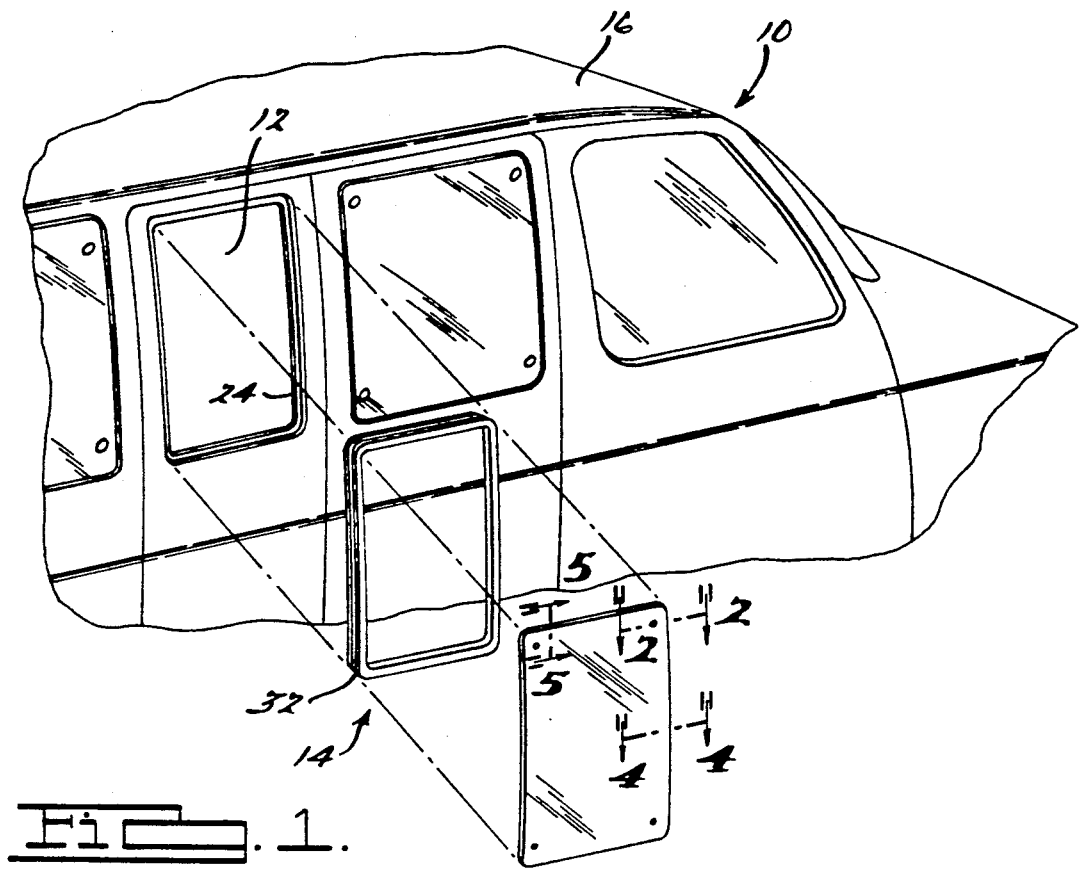
Fig. 1.
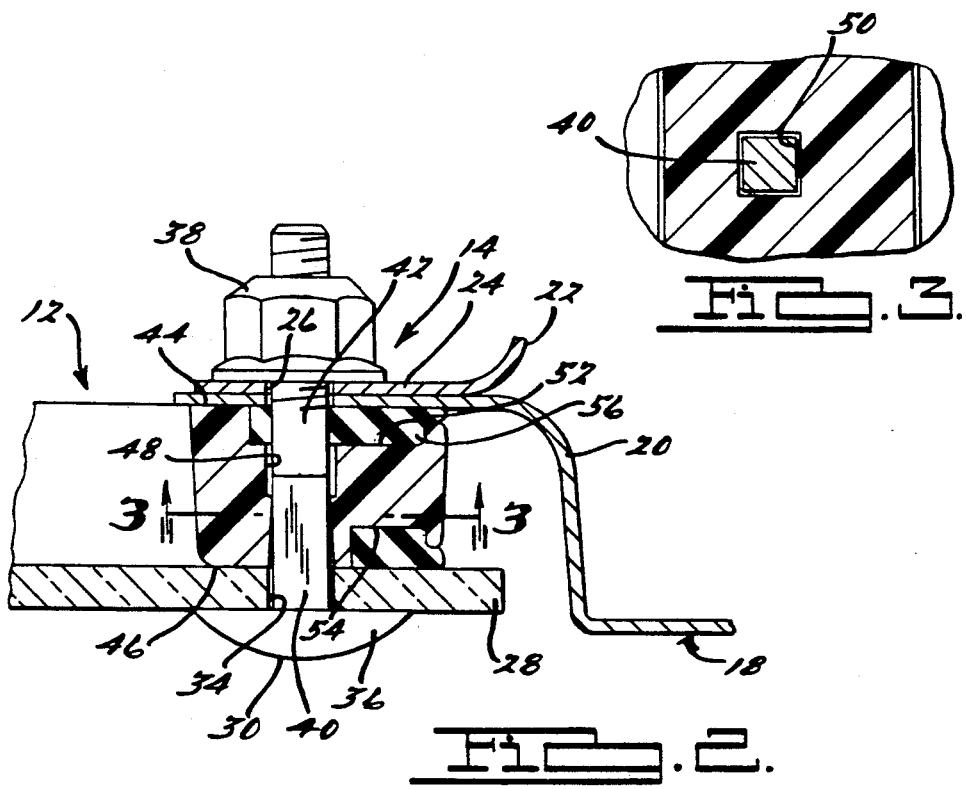
Fig. 3.
Fig. 2.

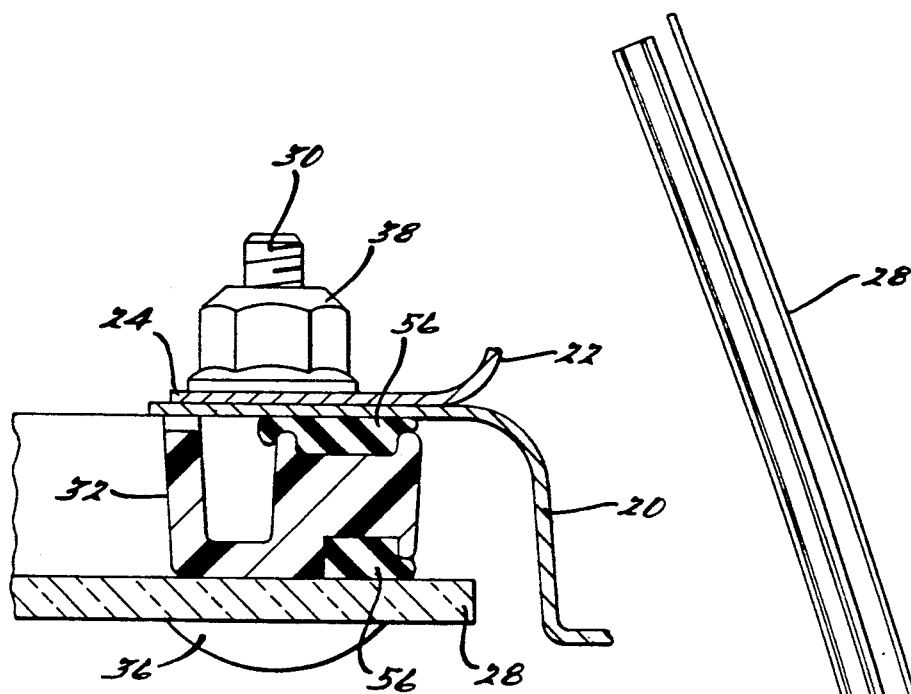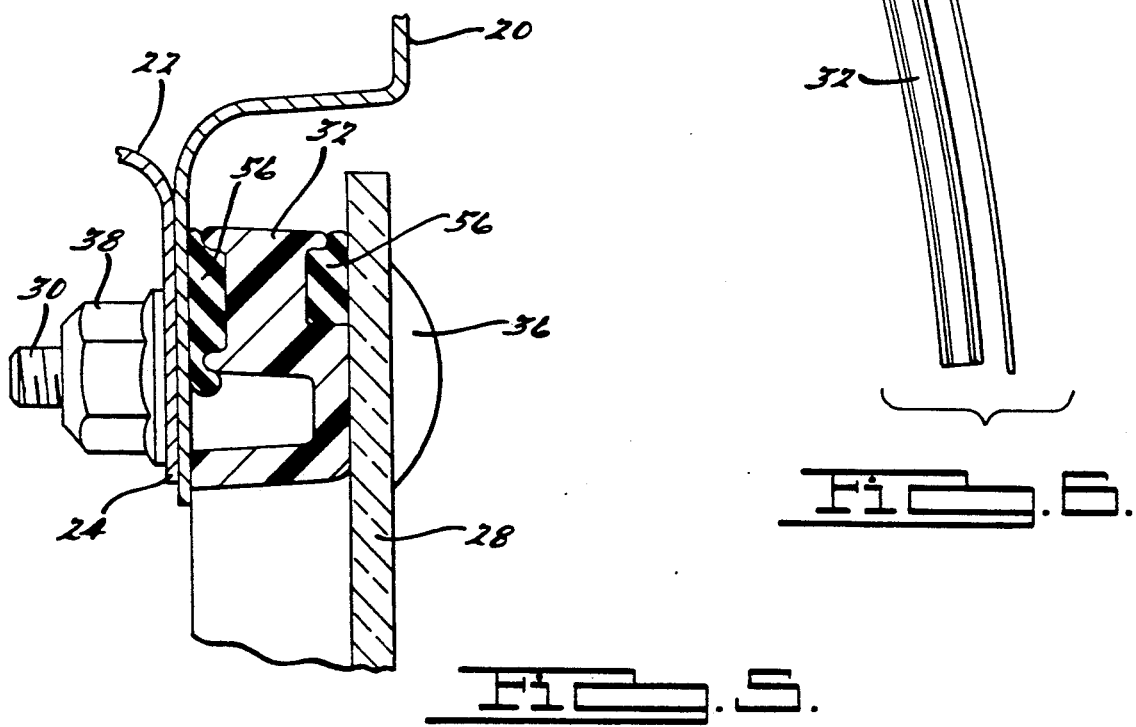

FIXED WINDOW MOUNTING ASSEMBLY

BACKGROUND OF THE INVENTION

Field of the Invention

The present invention relates generally to the mounting of windows in vehicle bodies, and more particularly to the structure for mounting such windows in flush relationship with adjacent surfaces of vehicle bodies.

The manufacturers of modern automobiles strive to improve the fuel economy of the vehicles that they produce in many ways. One way is through increased attention to aerodynamic effects in the design of vehicle bodies. This attention to aerodynamic considerations has resulted in changes in the approach to mounting windows in vehicle bodies. It is deemed desirable, both for the aerodynamic reasons and for aesthetic reasons, to maintain a surface continuity where windows are carried in the vehicle body. Automotive designers attempt to achieve flushness between the window glass and the adjacent exterior surfaces of the vehicle body. In the fixed side windows of vehicles, a modern popular approach to this achieving of flushness has been in the design of so-called "modular windows." These are windows in which an elastomeric frame is molded situ about the outer peripheral edge of the window glass, and the resulting assembly is inserted into a window aperture to be positioned against a rabbet flange. This approach suffers from a number of disadvantages. One is that the encapsulation results in a portion of the elastomer extending outwardly beyond the exterior planar surface of the window preventing the achieving of full flushness. Another is that accurately positioning and adjusting the position of the assembly in the vehicle window aperture necessitates the use of special clips and other non-standard fasteners. Yet another is that the encapsulated modular windows are relatively expensive to produce.

SUMMARY OF THE INVENTION

Responsive to the disadvantages of the previous known mounting arrangements, it is an object of the present invention to provide a window mounting assembly for fixed windows in automotive vehicles that economically facilitates the flush positioning of a window within the vehicle window aperture The object is accomplished that the provision of a window mounting system in which an apertured window is fixedly secured to the vehicle body through a plurality of fasteners, and a simple molded frame member is interposed between the window and the body to effect the flush positioning of the outer planar surface of the window with respect to the adjacent exterior surfaces of the vehicle body.

According to a feature of the invention, the molded frame member is adhesively secured in sealed relationship to the window and includes apertures configured for receiving the fasteners and for holding them against rotation during tightening engagement.

BRIEF DESCRIPTION OF THE DRAWINGS

These and other objects and features will be apparent to those skilled in the automotive vehicle body arts upon reading the following description with reference to the accompanying drawings in which:

FIG. 1 is an exploded perspective view of the window mounting assembly of the present invention illustrating the installation of a window in the side of a vehicle;

FIG. 2 is a cross-sectional view of a portion of the window mounting assembly taken along lines II—II of FIG. 1;

FIG. 3 is a cross-sectional view taken along lines III—III of FIG. 2;

FIG. 4 is a cross-sectional view of a portion of the window mounting assembly of the present invention taken along lines IV—IV of FIG. 1;

FIG. 5 is a cross-sectional view of a portion of the window mounting assembly of the present invention taken along lines V—V of FIG. 1; and FIG. 6 is an exploded side view of the window mounting assembly of the present invention.

DESCRIPTION OF THE PREFERRED EMBODIMENT

Turning now to the drawings, and in particular to FIG. 1 thereof, a vehicle 10 is illustrated as including a window aperture 12, whose closure is effected by the window mounting assembly 14 of the present invention. The construction of the window aperture 12 may be best appreciated by reference to FIGS. 2, 4 and 5. The vehicle 10 includes a body 16, which includes inter alia styled external surfaces as indicated at 18. The body 16 in general is formed through the joining of inner and outer panels, such as those indicated at 20 and 22. In the area of the window aperture 12, the inner and outer panels 20, 22 form a rabbet flange 24, which extends peripherally around the window aperture 12. The flange 24 is recessed a predetermined distance laterally inwardly from the outer body surface 18. A plurality of apertures, one shown at 26 in FIG. 2, are formed through the flange 24 to form a part of the window mounting assembly 14.

The remainder of the window mounting assembly includes a window 28 sized to be inserted within the aperture 12 in confronting relationship with the rabbet flange 24, a plurality of fasteners 30, and a unitary molded annular frame 32.

The window 28 is illustrated as comprising a glass pane, but other material panels, including translucent and opaque panels, may be utilized for effecting closure of the aperture 12. A plurality of apertures 34 is formed through the window 28 for receiving the fasteners 30 in a clearance providing relationship, the apertures 26 formed through the rabbet flange 24 are likewise sized to provide clearance with respect to the fasteners 30.

The fasteners 30 are preferably threaded fasteners having smooth heads, as indicated at 36, for enhancing the smoothness of the outer surface of the vehicle 10. A nut 38 threadedly receives each fastener 30 and clampingly urges the smooth head 36 of the fastener 30 against the window 28 to clamp the frame member 32 between the window 28 and the rabbet flange 24. A portion 40 of the shank 42 is formed to have a non-circular cross-section, as may best be seen in FIG. 2.

The frame member 32 is preferably molded as a unitary structure from a relatively hard plastic material, such as acrylonitrile butadiene styrene (ABS). It includes a flat mounting surface 44 for abuttingly engaging the flange 24 and a flat window mounting surface 46 abuttingly engaging the window 28. A plurality of bores 48 are formed in peripherally spaced relationship through the frame member 32 in juxtaposition with the apertures 26, 34 of the flange 24 and window 28, respectively. A portion 50 of the aperture 48 is formed of non-circular cross-section and registers with the non-circular portion 42 of the fastener 30. The correspondence of the cross-section of fastener 30 and the frame 32 effects driving engagement therebetween to function as an anti-rotation mechanism for the fastener 30 during tightening of the nut 38. While only a square mating cross-section is shown, it will be clear to those skilled in the art that many other cross-sections can be chosen which would effect driving engagement.

Also formed on the frame member 32 are inner and outer pockets 52, 54, respectively, which are illustrated as receiving a quantity of an adhesive sealant 56 for adhesively and sealingly securing and sealing the frame member 32 to both the flange 24 and the window 28. In one preferred embodiment, the adhesive sealant used is butyl covered foam tape. Other mechanisms for adhesively and sealingly securing the parts together, however, will be appreciated by those skilled in the art. Among these is the use of pressure sensitive tape and robotically applied pumpable sealant material, at least for fixing the frame 32 to the window 28. In the mounting assembly of the present invention, the tape or other material functions primarily and essentially as a sealant, the adhesive positioning function being redundant with the function of the fasteners.

To assemble a window 28 to a vehicle 10 according to this invention, the window 28 may be fabricated as a subassembly that includes the window 28, the fasteners 30 and the frame member 32 adhesively and sealingly secured thereto. The resulting subassembly be horizontally moved to abuttingly engage the rabbet 24 and drawn fast through rotation of the nuts 38. It will be understood that with the window so assembled the lateral outward projection of the window 28 with respect to the external body surface 18 is accurately controlled by the precision molded positioning of the mounting surfaces 44, 46 of the frame 32. The height of the frame 32 plus the thickness of the window 28 very closely equals the depth or position of the rabbit flange 24 from the external body surface 18. With the unitary molded frame member 32, this dimensional matching can be precisely controlled even for a curvilinearly formed glass arrangement, as shown in FIG. 6, or even for irregular shaping of the rabbet flange depression.

While only one embodiment of the present invention has been shown, others may be possible without departing from the scope of the appended claims.

I claim:

1. A window mounting assembly for an automotive vehicle of the type having a window opening formed through the vehicle body and surrounded by a flange spaced a predetermined distance from an exterior surface of the body, the window mounting assembly comprising:

means defining a plurality of apertures through said flange;

a window sized to be positionable in confronting relationship with said flange and having a plurality of apertures formed therethrough in juxtaposition with said flange apertures;

a plurality of fasteners extending through said apertures for securing said window to said flange; and a unitary molded annular frame means carried between said window and said flange and operative to position the exterior planar surface of said window substantially flush with said body exterior surface.

2. A window mounting assembly as defined in claim 1 and further comprising sealing means interposed between said window and said frame means.

3. A window mounting assembly as defined in claim 1 and further comprising sealing means interposed between said flange and said frame means.

4. A window mounting assembly as defined in claim 2 and further comprising sealing means interposed said flange and said frame means.

5. A window mounting assembly as defined in claim 1, wherein said frame means extend continuously peripherally in confronting relationship with said flange and has formed therethrough a plurality of apertures for receiving said fasteners.

6. A window mounting assembly as defined in claim 1, wherein said fasteners comprise a smooth headed bolt and a nut.

7. A window mounting assembly as defined in claim 5, wherein said frame means further comprises anti-rotation means for resisting rotation of said fastener.

8. A window mounting assembly as defined in claim 6, wherein said frame means further comprises anti-rotation means for resisting rotation of said fastener.

9. A window mounting assembly as defined in claim 8, wherein said anti-rotation means comprises means defining the shape of said window apertures in non-complementary relationship with said bolt.

10. A window mounting assembly as defined in claim 4, wherein said frame means comprises:

a flange mounting surface abuttingly engaging said flange;

a window mounting surface abuttingly engaging said window; and surfaces spaced internally of said mounting surfaces with respect to said frame means and receiving said sealant thereon.

11. A window mounting assembly as defined in claim 1, wherein said frame means is formed from a hard plastic material.

12. A window mounting assembly as defined in claim 1, wherein said frame means is formed from acrylonitrile butadiene styrene.

* * * * *